US009253188B2

(12) United States Patent
Bhasin et al.

(10) Patent No.: US 9,253,188 B2
(45) Date of Patent: Feb. 2, 2016

(54) MOBILE TERMINAL AUTHORISATION ARRANGEMENTS

(75) Inventors: Jyoti Bhasin, Newbury (GB); Greg Reeve, Newbury (GB)

(73) Assignee: Vodafone Group PLC, Newbury (GB)

( * ) Notice: Subject to any disclaimer, the term of this patent is extended or adjusted under 35 U.S.C. 154(b) by 492 days.

(21) Appl. No.: 12/736,199

(22) PCT Filed: Mar. 17, 2009

(86) PCT No.: PCT/EP2009/053155
§ 371 (c)(1),
(2), (4) Date: Nov. 16, 2010

(87) PCT Pub. No.: WO2009/115528
PCT Pub. Date: Sep. 24, 2009

(65) Prior Publication Data
US 2011/0078773 A1 Mar. 31, 2011

(30) Foreign Application Priority Data

Mar. 17, 2008 (GB) .................................. 0804979.3
Jan. 23, 2009 (GB) .................................. 0901116.4

(51) Int. Cl.
*G06F 7/04* (2006.01)
*G06F 15/16* (2006.01)
*G06F 17/30* (2006.01)
*H04L 29/06* (2006.01)
*H04W 12/06* (2009.01)
*H04W 12/00* (2009.01)

(52) U.S. Cl.
CPC ........... *H04L 63/0838* (2013.01); *H04W 12/06* (2013.01); *H04L 63/08* (2013.01); *H04L 63/166* (2013.01); *H04W 12/00* (2013.01)

(58) Field of Classification Search
CPC ...... H04W 12/00; H04W 12/06; H04L 63/08; H04L 63/083; H04L 63/0838; H04L 63/0853
USPC ................... 726/2, 4, 11, 12, 17–19; 713/184
See application file for complete search history.

(56) References Cited

U.S. PATENT DOCUMENTS 6,928,558 B1 * 8/2005 Allahwerdi ............. G06F 21/31
                                                         713/172
7,100,203 B1    8/2006 Tosey
7,571,489 B2 * 8/2009 Ong et al. ...................... 726/29
(Continued)

FOREIGN PATENT DOCUMENTS

JP       2008033438      2/2008
WO    WO 03/032126 A2   4/2003
(Continued)

*Primary Examiner* — Ashok Patel
*Assistant Examiner* — Daniel Potratz
(74) *Attorney, Agent, or Firm* — Knobbe Martens Olson & Bear LLP

(57) ABSTRACT

An end-to-end client server system and related method for use in conjunction with mobile terminals. A client application on a mobile terminal is configured to remotely access a backend server via a gateway system. The mobile terminal includes a client application configured to generate a one time password using secret information and a password library, both known only to the client application and a verification component of the gateway system. The one time password provides an additional level of security, which is user dependent and not network dependent.

17 Claims, 5 Drawing Sheets

(56) References Cited

U.S. PATENT DOCUMENTS

| | | | |
|---|---|---|---|
| 7,941,184 B2* | 5/2011 | Prendergast et al. | 455/558 |
| 8,666,366 B2* | 3/2014 | DeAtley | H04L 63/08 455/410 |
| 2003/0115378 A1 | 6/2003 | Zondervan et al. | |
| 2006/0184787 A1 | 8/2006 | Sandhu et al. | |
| 2008/0034216 A1 | 2/2008 | Law | |
| 2008/0137861 A1* | 6/2008 | Lindmo | G06F 21/31 380/270 |
| 2008/0249947 A1* | 10/2008 | Potter | G06F 21/31 705/67 |
| 2009/0106138 A1* | 4/2009 | Smith et al. | 705/35 |
| 2009/0119759 A1* | 5/2009 | Taugbol | 726/6 |

FOREIGN PATENT DOCUMENTS

| | | |
|---|---|---|
| WO | WO 2004/056038 A1 | 7/2004 |
| WO | WO 2006/044717 A2 | 4/2006 |
| WO | WO 2006/063194 A2 | 6/2006 |
| WO | WO 2006/076696 A2 | 7/2006 |
| WO | WO 2007/000179 A1 | 1/2007 |
| WO | WO 2007/096249 A1 | 8/2007 |

* cited by examiner

MOBILE TERMINAL AUTHORISATION ARRANGEMENTS

TECHNICAL FIELD

This application relates to a mobile terminal, an application for use thereon and/or a gateway system configured to communicate with the mobile terminal application regarding identity verification. More particularly, this application relates to a system and/or method for allowing an appropriately configured mobile terminal to securely access a remote server.

BACKGROUND

With the advent of 3G mobile terminals, particularly UMTS and GPRS-enabled terminals, the ability for greater functionality to be performed by such terminals, in addition to standard voice calls, has become possible.

For instance, end-to-end client-server systems have been developed for use in conjunction with mobile terminals. Such systems enable enterprise/back-end databases and applications to be represented and manipulated on mobile devices in a secure fashion. These systems provide field workers (i.e. those working off-site) with the ability to access certain back-end business systems and databases, for example.

The client component of such end-to-end systems comprise an application installed on one or more mobile terminals. Such mobile terminal applications typically perform one or more of the following functions:
- Mediating between the mobile device and the enterprise system to transfer only the data that is required by the device;
- Providing secure access to applications/servers only by users who are authorised to use those applications;
- Keeping data on the mobile device and the enterprise system synchronized and up to date; and/or
- Providing a suitable user interface to render data and other functionality to the terminal in a format that is suitable for the terminal.

To date, in order to ensure a suitable level of security, an entity, such as a telecommunications network service provider, hosts a Network Applications Manager (NAMan) server, allowing only authorised terminal users the ability to remotely access one or more back-end servers registered with the NAMan server. Such systems can be configured so that they are accessed by multiple users from multiple organisations, or by multiple users from a single organisation, which would be the case in the situation of company employees remotely accessing their company's back-end databases.

With reference to FIG. 1, the operation of such a system will be explained, where a user of a mobile terminal 10 wishes to access a backend/enterprise system for which they are registered to use. The user of the mobile terminal 10 would activate the appropriate client application preinstalled on the mobile terminal 10. The installed application will typically have a Graphical User Interface (GUI) in order to provide a user-friendly interface. The application requests a password for enabling the client application and the user enters this password. The client application checks the password against its internal database. The client application may then additionally request a password for the NAMan server.

The client application has an Access Point Name (APN) for the NAMan server 12, in order to enable the client application to access the NAMan server 12, serving as a gateway to the back-end systems 13, 14 and 15. The APN indicates to the GGSN which network/sub-network to give the user access to.

Therefore, once the client application is activated, the terminal connects to the network using its provisioned APN by creating a PDP context. The PDP context is forwarded to the service provider's GGSN 11, which verifies that the user is a subscriber to the NAMan server, identified by the APN, using a RADIUS (Remote Authentication Dial In User Service) server. In this regard, as security requirements dictate that a user should be authenticated before it connects to the NAMan server, the MSISDN (Mobile Subscriber International Subscriber Identity Number) associated with the mobile terminal is extracted from the PDP context and presented to the RADIUS server for an authentication check. The MSISDN is a unique number on the network and may be stored on the user's SIM card. The RADIUS server stores the MSISDNs of users allowed access to each of the backend system(s).

Once the user is validated, the GGSN 11 forwards the access request (including the NAMan password, if required) to the NAMan server 12, which allows the mobile terminal 10 access to the appropriate back-end server 13, 14 or 15. The client application may additionally request a username and password for back-end server 13, 14 or 15. The appropriate back-end server will be that which corresponds to the client application activated on the terminal 10. The GGSN 11 will route traffic received from the NAMan server to the terminal.

Once a user has gained access to the backend server, they are able to retrieve any data that they require and also, where they have been previously been using their client application "off-line", synchronise the data on their terminal with the backend server. To achieve synchronisation, any changed application data is uploaded to the NAMan server for onwards storage in the enterprise/backend system. The NAMan server does not permanently store application data; it merely acts as a conduit for data being transferred to the backend server. Communications between the NAMan server and the application on the mobile terminal typically are undertaken by the exchange of XML messages.

In terms of providing "off-line" functionality, the terminal application may be configured to allow the user to access and manipulate data previously downloaded from the backend system—such as a list of jobs that the user needs to perform that day and/or specific customer data. For instance, the user may mark off the jobs as each is done and also update the customer data, such as by correcting address details and updating their product/service requirements. Where this is performed offline, the changes are only effected in regard to the data on the terminal. When the user next goes "online", by performing the verification through the NAMan server, as described above, they are then able to again directly access the back-end system, and the data on the terminal can be synchronised with the backend data.

This approach works well where all remote users of the system subscribe to the particular telecommunications service provider providing the secure access to the backend system via their GGSN 11. In this regard, the service provider's GGSN has been configured to provide the RADIUS server with the data necessary for securely verifying the user/terminal as an authorised user, by extracting the user's MSISDN from their access request PDP context.

However, in today's competitive mobile telecommunications marketplace, many companies are not requiring all of their employees who have a company mobile terminal to subscribe to the same service provider, so for example, some employees may subscribe to Vodafone, whilst others subscribe to BT and Orange. In such a situation, requests for access to the NAMan server 12 would not necessarily go through the managing service provider's GGSN 11, which would be required to obtain the appropriate level of user verification, since it is specially configured to only forward requests from terminals with authorised MSISDNs.

Whilst it may be possible for access requests to be alternatively routed through another service provider's network to the managing service provider's GGSN 11, the GGSN 11 would not have the same degree of verification control, as it would only be able to have access to the MSISDN of the terminal by requesting the other network to provide it. This is not desirable, as the other service provider may not cooperate and refuse to provide the MSISDN information. Further, even if the other service provider did provide the MSISDN, the service provider managing the server 12 does not have full control over the verification process, and hence is more susceptible to hacking attacks.

A similar problem exists in relation to roaming users. Under the current arrangement, since the user needs to access the backend server via GGSN 11 of the managing network operator, if the user is in a country where the network operator does not have a presence or network operator does not have roaming connectivity, the user will not be able to directly access the back-end system via GGSN 11, and would need cooperation from the local service providers in order to obtain the MSISDN for the verification process.

There is therefore a need for an end-to-end client-server system that can operate more securely over different service providers/network operators or over otherwise non-compatible networks.

SUMMARY OF THE INVENTION

According to a first aspect, the present invention provides, in a mobile telecommunications network including a back-end system and a gateway system, the gateway system providing a means of access to the back-end system via the mobile telecommunications network, and the backend system having one or more designated users authorised to access the back-end system via the gateway system, a method of providing user authorisation for accessing the back-end system, the method including: receiving an access request at the gateway system from the designated user, the access request including a unique identity relating to the user and a first password generated by the designated user using first information; verifying the first password by comparing the first password with a corresponding password independently generated by a component of the gateway system using corresponding first information stored in relation to the unique identity of the user on the gateway system.

The first information and the corresponding first information may be unique, so that the first password is only once usable. In this regard the first information can be considered as a "shared secret".

It is noted that the additional security provided by the one time password generation and verification procedure is not network dependent, and so can be used across any mobile service provider's network without requiring the unique configuration of any network elements.

It is also noted that the first information may include user specific information, so that the verification of the first password additionally provides a verification of the user sending the first password being the correct user. The user specific information may be a unique identity associated with the user/user terminal, such as the MSISDN, a SIM serial number, IMSI, IMEI a pseudo MSISDN, a SIM serial number, a MAC address (particularly for devices using WLAN/WiFi) an Integrated Circuit Card ID and/or an equivalent unique CDMA device identifier.

In this way, it becomes possible the authentication server to verify the user's ID from the one time password, without requiring a third party network to provide the terminal's MSISDN, since the one time password is generated using this unique user identity. It is therefore possible to achieve authentication across non-compatible networks, such as a first network operated by a first network provider and a second network operated by a second network provider. The one time password, particularly where it is generated with user specific information provides a secure authentication mechanism that removes the requirement of a RADIUS authentication, and also the need for the first network service provider to provide the MSISDN with the authentication request.

More particularly, generating the password, using first information known only to the application on the mobile terminal and the secure component of the gateway system, and making the password only once usable, ensures these embodiments of the invention are sufficiently secure and network independent, so that mobile terminals can access their backend system securely from anywhere telecommunications services are available. Further, by making the passwords only once usable, even tighter security is provided.

The first aspect of the invention may further include receiving a second password from the designated user, the second password indicative of information known by the designated user; verifying the second password by comparing the second password with a corresponding password stored in relation to the unique identify of the user on the gateway system; and authorising the user to access the back-end system when both the first and second passwords have been verified.

Therefore, in this way, the One Time Password is effectively a first authentication factor of information the user is in possession of (e.g. the shared secret), which can be verified, and the second authentication factor is information that the user knows (e.g. the user's password and/or username for accessing the back-end system).

In accordance with a second aspect, the present invention provides, in a mobile telecommunications network including a back-end system and a gateway system, the gateway system providing a means of access to the back-end system via the mobile telecommunications network, and the backend system having one or more designated users authorised to access the back-end system via the gateway system, a method of providing user authorisation for accessing the back-end system, the method including: receiving an access request at the gateway system from the designated user, the access request including a unique identity relating to the user and an only once usable password which is verifiable by the gateway system.

In accordance with a third aspect, the present invention provides, in a mobile telecommunications network including a back-end system and a gateway system, the gateway system providing a means of access to the back-end system via the mobile telecommunications network, and the backend system having one or more designated users authorised to access the back-end system via the gateway system, a method of generating authorisation data in a mobile terminal, in order to allow the mobile terminal to access the back-end system, the method including: generating a first password in the mobile terminal using first information stored securely on the mobile terminal; and transmitting the first password and a unique identity relating to the mobile terminal user to the gateway system, wherein the first information corresponds to first information stored in relation to the user's unique identity on the gateway system, which allows a component of the gateway system to verify the first password by comparing the first password with a corresponding password independently generated using the corresponding first information.

In accordance with a fourth aspect, the present invention provides, in a mobile telecommunications network including a back-end system and a gateway system, the gateway system providing a means of access to the back-end system via the mobile telecommunications network, and the backend system having one or more designated users authorised to access the back-end system via the gateway system, a method of generating authorisation data in a mobile terminal, in order to allow the mobile terminal to access the back-end system, the method including: generating a first password in the mobile terminal such that the first password is a once usable password which is only verifiable by the gateway system; and transmitting the first password and a unique identity relating to the mobile terminal user to the gateway system for verification thereof.

In accordance with a fifth aspect, the present invention provides, a gateway system configured for use in a mobile telecommunications network, and configured to provide one or more designated users with a means of access to the back-end system via the mobile telecommunications network, the gateway system including: receiver configured to receive an access request from a given user across the mobile telecommunications network, the access request including a unique identity relating to the user and a first password generated by the given user using first information; verification means configured to: retrieve corresponding first information stored in relation to the unique identity of the user; independently generate a corresponding password using the corresponding first information; and verify the first password by comparing the first password with the corresponding password.

According to a sixth aspect, the present invention provides the present invention provides, a gateway system configured for use in a mobile telecommunications network, and configured to provide one or more designated users with a means of access to the back-end system via the mobile telecommunications network, the gateway system including: receiver configured to receive an access request from a given user terminal across the mobile telecommunications network, the access request including a unique identity relating to the user and an only once usable password; verification means configured to verify the only useable password using unique information known only to the verification means and the given user terminal.

According to a seventh aspect, the present invention provides a mobile terminal configured for use in a mobile telecommunications network, and configured to provide a designated user with a means of access to a back-end system via the mobile telecommunications network and a gateway system, the mobile terminal being further configured to: generate a first password using first information stored securely on the mobile terminal; and transmitting the first password and a unique identity relating to the mobile terminal user to the gateway system, wherein the first information has corresponding first information stored in relation to the user's unique identity on the gateway system, which corresponding information allows a component of the gateway system to verify the first password by comparing the first password with a corresponding password independently generated using the corresponding first information.

According to an eighth aspect, the present invention provides a mobile terminal configured for use in a mobile telecommunications network, and configured to provide a designated user with a means of access to a back-end system via the mobile telecommunications network and a gateway system, the mobile terminal being further configured to: generate a first password such that the first password is a once usable password which is only verifiable by the gateway system; and transmitting the first password and a unique identity relating to the mobile terminal user to the gateway for verification thereof.

According to a ninth aspect, the present invention provides method of managing a communication session between a secure server and a mobile terminal in a mobile telecommunications network comprising: authenticating a user of the mobile terminal as an authorised user of the server; initiating a first timer setting a first time period within which a communication is to be transmitted by the mobile terminal to the server; initiating a second timer setting a second time period within which a communication is to be transmitted by the server to the mobile terminal; and upon the expiration of at least one of the timers, terminating or suspending the communication session.

According to a tenth aspect the present invention provides a communication management system configured for use in a mobile telecommunications network, and configured to manage a communication session between a mobile terminal and a secure server, the system comprising:
- a first timer setting a first time period within which a communication is to be transmitted by the mobile terminal to the server;
- a second timer setting a second time period within which a communication is to be transmitted by the server to the mobile terminal; and
- a communication controller configured to monitor the first and second timers and upon the expiration of at least one of the timers, terminate or suspend the communication session.

According further to the ninth and tenth aspects of the invention, when the first timer expires, a transparent One-Time-Password authentication may be performed, and when the second timer expires, a 2 factor authentication may be performed.

BRIEF DESCRIPTION OF THE DRAWINGS

Embodiments of the system described herein are explained in greater detail below based on the drawings, which are briefly described as follows.

DETAILED DESCRIPTION

Figure 1:
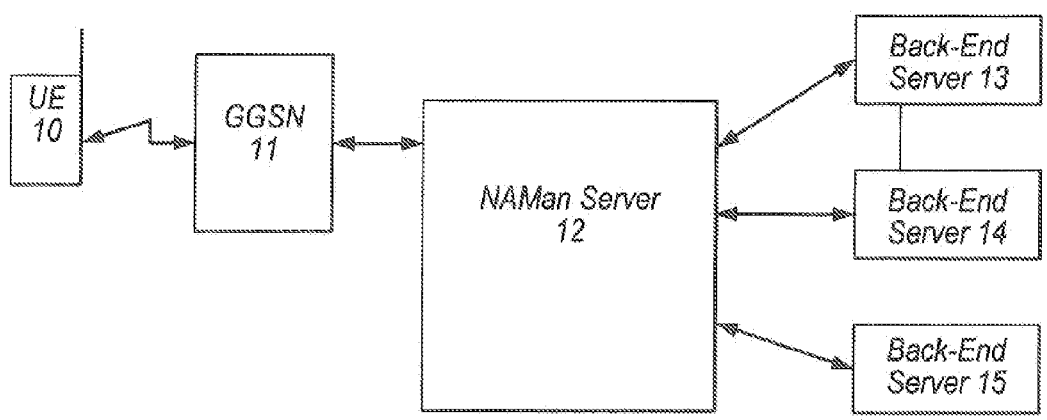
FIG. 1 illustrates a schematic diagram of an end-to-end client server system according to the prior art.
Figure 2:
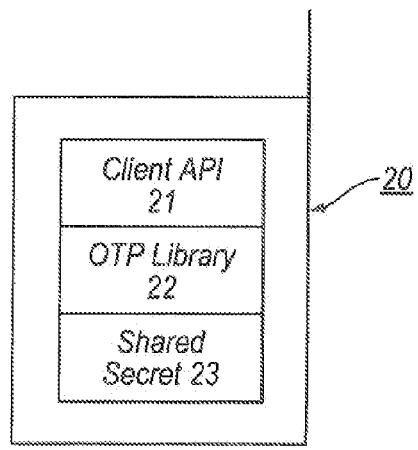
FIG. 2 illustrates components of a mobile terminal according to an embodiment of the system described herein.

A first embodiment of the invention will now be described. With reference to FIG. 2, for a user of a terminal 20 to access a backend/enterprise system, the terminal includes an installed Client Application 21 for the backend system. An example of a suitable program for creating the Application is the Dexterra Concert™ system. This program is particularly advantageous as it is compatible with a number of existing Enterprise systems, including SAP™, Oracle™, Siebel™, Clarify™ and other similar backend Enterprise systems. The expression "Enterprise systems" is intended to cover any server, application and/or database for which secure access is required. Enterprise systems are typically corporate systems, including corporate accounting systems, company diary information and other corporate record keeping systems.

The mobile terminal 20 further includes a One Time Password (OTP) library 22 and a Shared Secret 23 associated with the Client Application. The purpose of the OTP library 22 is to provide a One-Time-Password, which is generated using the Shared Secret 23 and preferably a variable count or other algorithm. This shared secret and OTP library are preferably stored encrypted and embedded in the Client application, such that any time the Client Platform is removed from the device, this library would be removed along with it. This OTP library is ideally hidden and not accessible to the user of the terminal.

The Client Application 21 is preferably a software application on the user device, although it may be alternatively implemented, such as in hardware. The client Application typically performs the following functions:

Initiating and managing the 2 factor authentication;
Authenticating the user by checking the unique user identifier (e.g. SIM serial no., MAC address, the IMSI no. and/or the IMEI no. of the terminal);
Managing the security of the data such as the OTP library, login credentials and other application data;
Managing the application data flow between the terminal and the NAMan server, once access is granted; and
Managing application version updates without the loss of transient data.

In the interest of creating a more modular architecture and a future-proof design for further reuse of components, it is preferable that the Client Application 21 and the application data (e.g. the OTP library and the shared secret) are separate components that can be updated or enhanced independently. This will also ensure that more applications can be added to the mobile terminal (e.g. to access a number of different servers managed by the one provider) without any need to re-implement the OTP application data.

Figure 3:
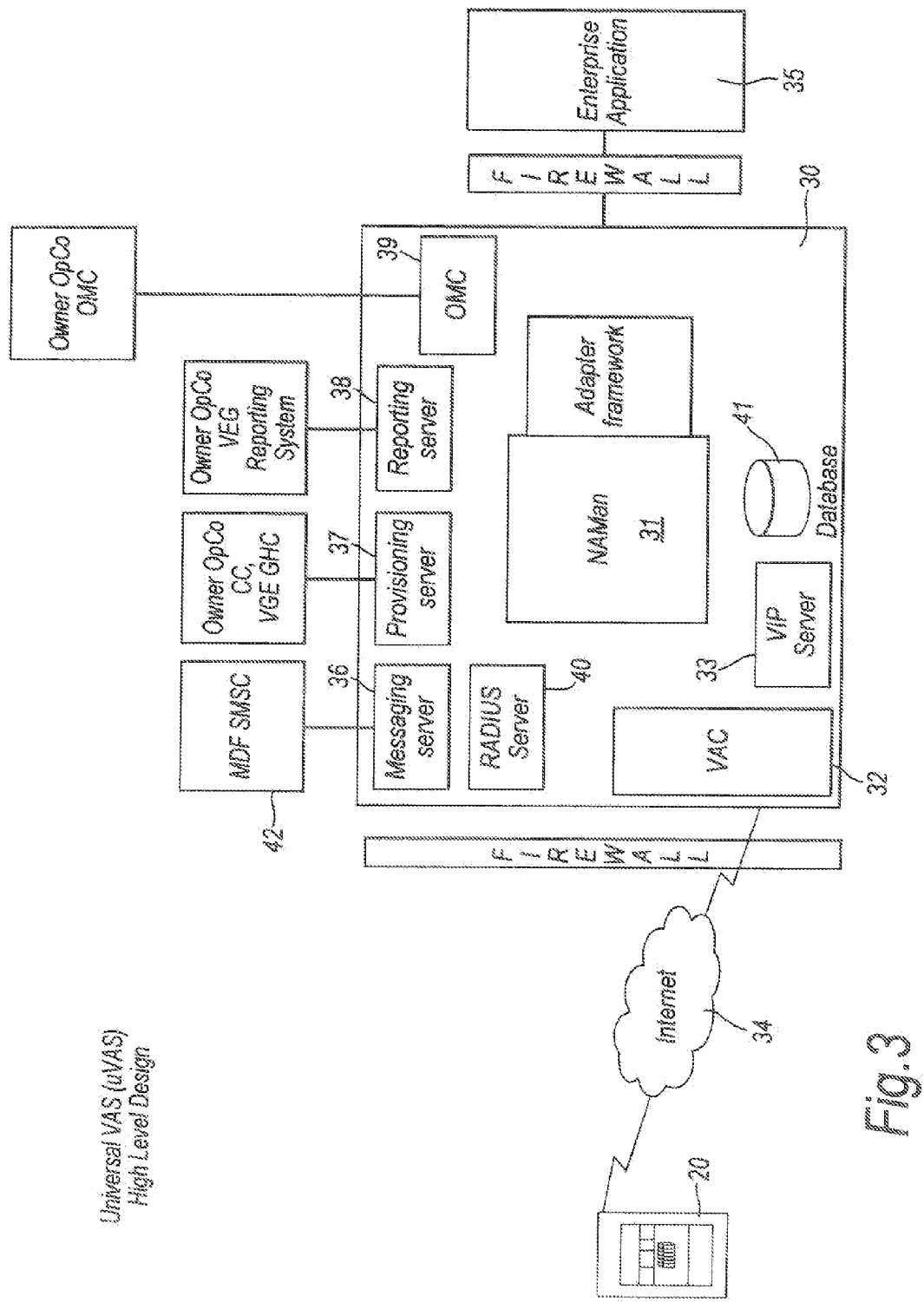
FIG. 3 illustrates a schematic diagram of an end-to-end client server system according to an embodiment of the system described herein.

With reference to FIG. 3, the Client Application 21 is configured to communicate with a NAMan (Network Applications Manager) environment 30 in order to access the backend Enterprise system 35 for which it is registered. This access is via a NAMan server 31, which is typically a HTTP server. Preferably this server is based on the Dexterra™ Mobility Platform Server. The NAMan server typically uses a Structured Query Language (SQL) server database as storage for meta-data and user and application configurations. The NAMan server 31 is in effect a conduit between the enterprise application 35 and mobile terminal 20.

Preferred security requirements dictate that a user terminal 20 should be authenticated before it connects to the NAMan server 31 i.e. at a network level. The NAMan environment 30 therefore includes a Verification Access Module (VAC) 32, which is a proxy server that logically separates the NAMan environment 30 from any access that has not been authenticated. Access to the NAMan server 31 is typically through an open Internet environment 34, so the VAC 32 is effectively a Gatekeeper that allows only authenticated users access to the NAMan server 31. That is, in this arrangement the VAC is the first point of contact for any outside communication directed to the NAMan environment.

The VAC 32 is also responsible for carrying out the task of intelligent routing of authentication information between the VIP server 33 and the NAMan server.

Once authentication has been completed successfully, the VAC will perform synchronisation session management between the client application 21 and the NAMan server 31 by initiating timers configured to time out the session, for instance after 60 seconds, if no response is received from either the device 20 or the NAMan server 31.

The VAC effects the authentication using Identity Protection (VIP) server 33. The VIP server 33 is the Authentication engine that controls the process of validating the client identity by the use of a "Shared Secret". This secret information is only shared between the client API 21 on terminal 20 and the VIP server 33. The VIP server uses a secure algorithm to generate the unique shared secret in order to ensure end-to-end security. For instance, one approach of generating the shared secret involves incorporating a unique identity of the user into the secure algorithm. For example, the SIM serial number which is a unique identity of the user's SIM, could be used. Alternatively, the IMSI, IMEI or MSISDN associated with the user could be used.

The purpose of the shared secret is to provide each terminal with a unique and secret basis from which to generate one time passwords, which can then be verified by the VIP server, which in turn knows the shared secret and formula for generating each one time password.

At any given time, the VIP Server 33 is capable of handling multiple simultaneous verification requests. The number of such requests that can be supported should be at least 20% of the total number of users supported by the NAMan server.

In FIG. 3, the VIP server is shown as a component of the NAMan environment 30; however, the VIP server 33 may alternatively be remote from the NAMan environment, but able to communicate securely therewith. For instance, all components in the NAMan environment preferably communicate with one another over secure Virtual Private Network (VPN) links or even leased lines.

Additional components of the NAMan environment 30, which are useful, but not essential to the present embodiments of the invention include:

a Messaging Server 36, responsible for all SMS messaging, such a Welcome SMS sent to a new user registered with the NAMan server. This SMS typically contains a URL from where the user can download the required client application and a temporary password. Further, in the event that the mobile terminal has lost a data connection with the NAMan environment, this server will send "wake-up" SMS messages required for the push-pull SMS mechanism. The push-pull SMS in this regard can be used to start or restart a connectivity session for any data synchronisation that needs to be performed by the back end application;

a Provisioning Server 37, which is responsible for registering and deregistering new users;

a Reporting Server 38 responsible for collecting records at periodic intervals from other elements in the NAMan system, such as a list of new users registered by the provisioning server;

an Operation Monitoring Control (OMC) component 39 for monitoring the performance of elements in the NAMan environment; and a RADIUS Server 40 for performing verification of legacy terminals not updated with the OTP library/Shared Secret required for the present embodiment of the invention, in order to allow the NAMan environment to be used transitionally. The RADIUS may also be used when a user has been provisioned with a specific APN, in addition to the OTP library/shared secret, so that RADIUS verification is performed in addition to the two pronged authentication described below. A flag can be used to indicate the users for which this additional verification step is required.

Further, the NAMan server preferably has Adapter Framework which is capable of connecting to multiple back-end enterprise servers simultaneously and transforming the information from those servers to match the data required by different client applications, as necessary. It is also preferably capable of assigning permission to use an application to users and groups, and also to apply permissions or restrictions on the use of permitted types and numbers of adapters.

In this regard, "adapters" are the various connections from the NAMan server to the back-end enterprise servers that ask for and bring back only the information that is relevant for the application on device. Different adapters connect to a different type of system in an Enterprise server configuration. For example, if the user has two applications on his device, a 'Sales' application that pulls data from an enterprise's back-end SAP server and another 'Service' application that pulls the data from a backend Siebel server, then the device could be using two different adapters on the NAMan server in order to allow the different applications to work. Also the enterprise server configuration can apply different restrictions to the user for these two applications, e.g.—the user may be able to view, change and update the data for the sales application but only have permission to view the data for service application.

The NAMan server is also preferably stateless, so that it does not retain session information between requests. That is, each communication with a client application is atomic and does not happen in multiple parts where one part is dependent upon another.

Further facilities may also be provided to the NAMan environment via an external infrastructure provided by the service provider managing the overall system. For instance, the managing service provider will typically provide an SMS Centre (SMSC) for handling SMS communications to user terminals (e.g. to enable download of applications) and a billing system.

Figure 5:
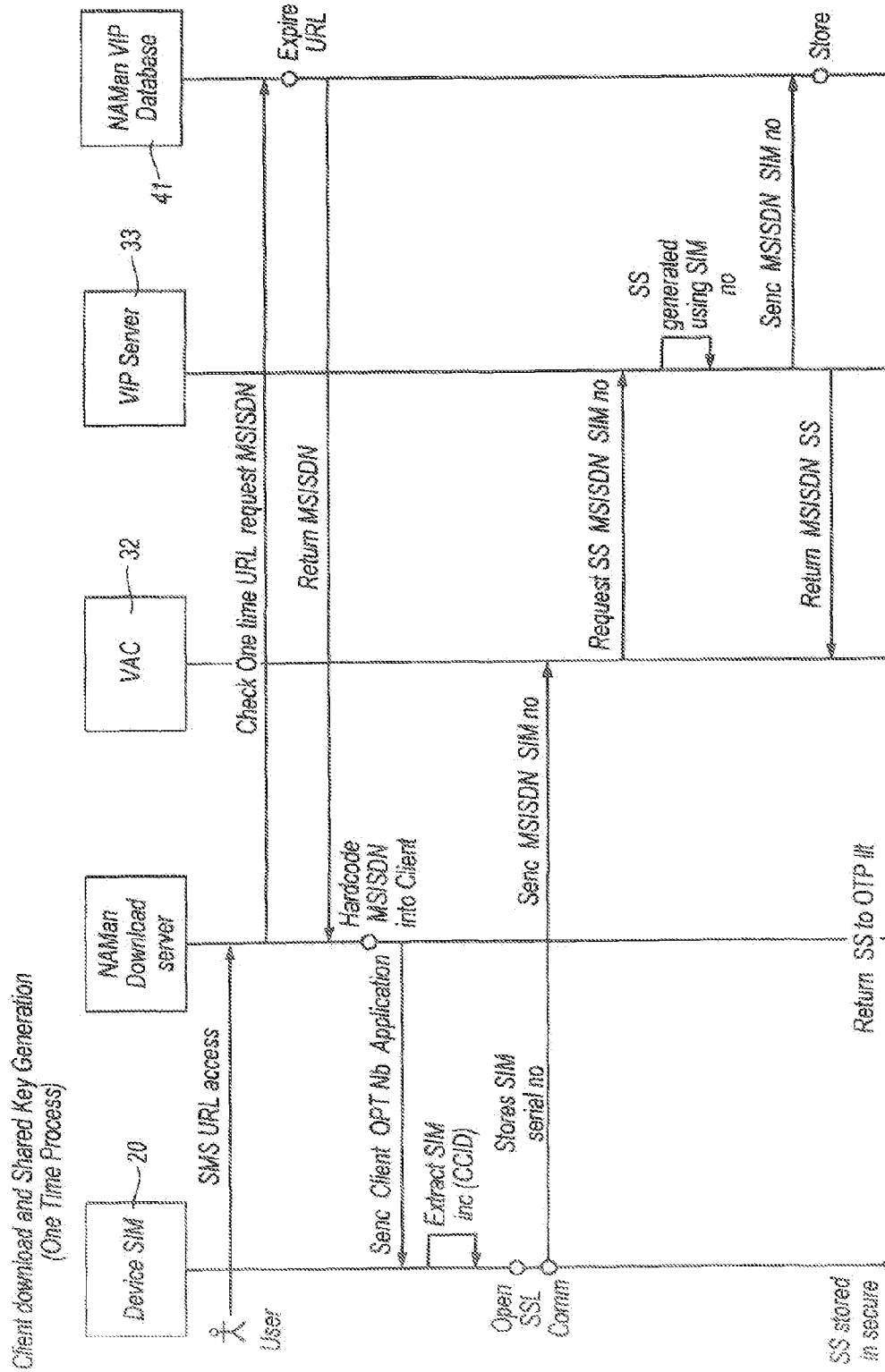
FIG. 5 illustrates a step diagram of a process for a user downloading a client application to a mobile terminal according to an embodiment of the system described herein.
Figure 6:
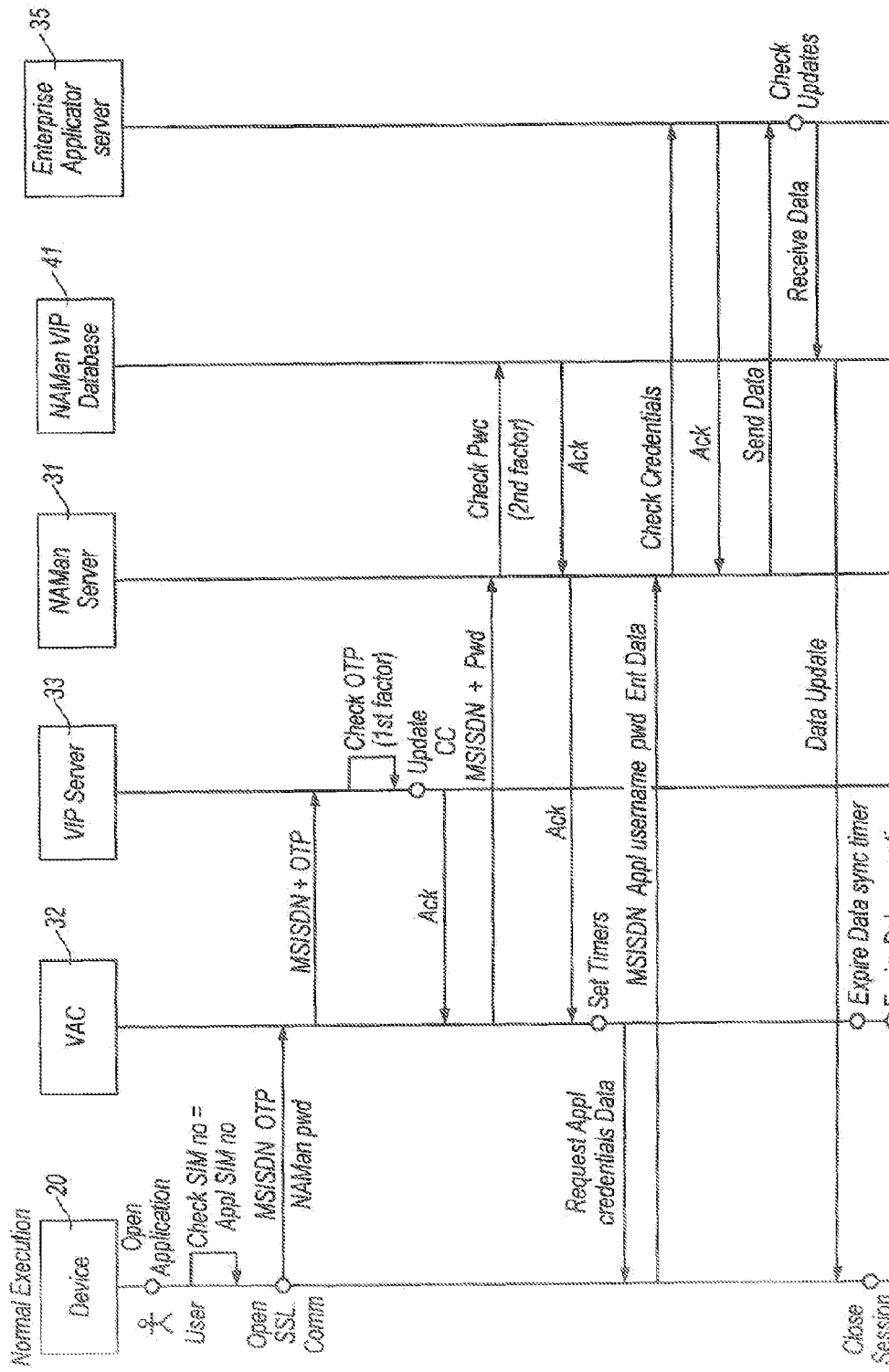
FIG. 6 illustrates a step diagram of a process of a client application on a mobile terminal being authenticated and synchronising data with its enterprise server, once authenticated, according to an embodiment of the system described herein.

The functionality of this end-to-end client-server system according to embodiments of the invention will now be described with reference to FIGS. 4 to 6.

Figure 4:
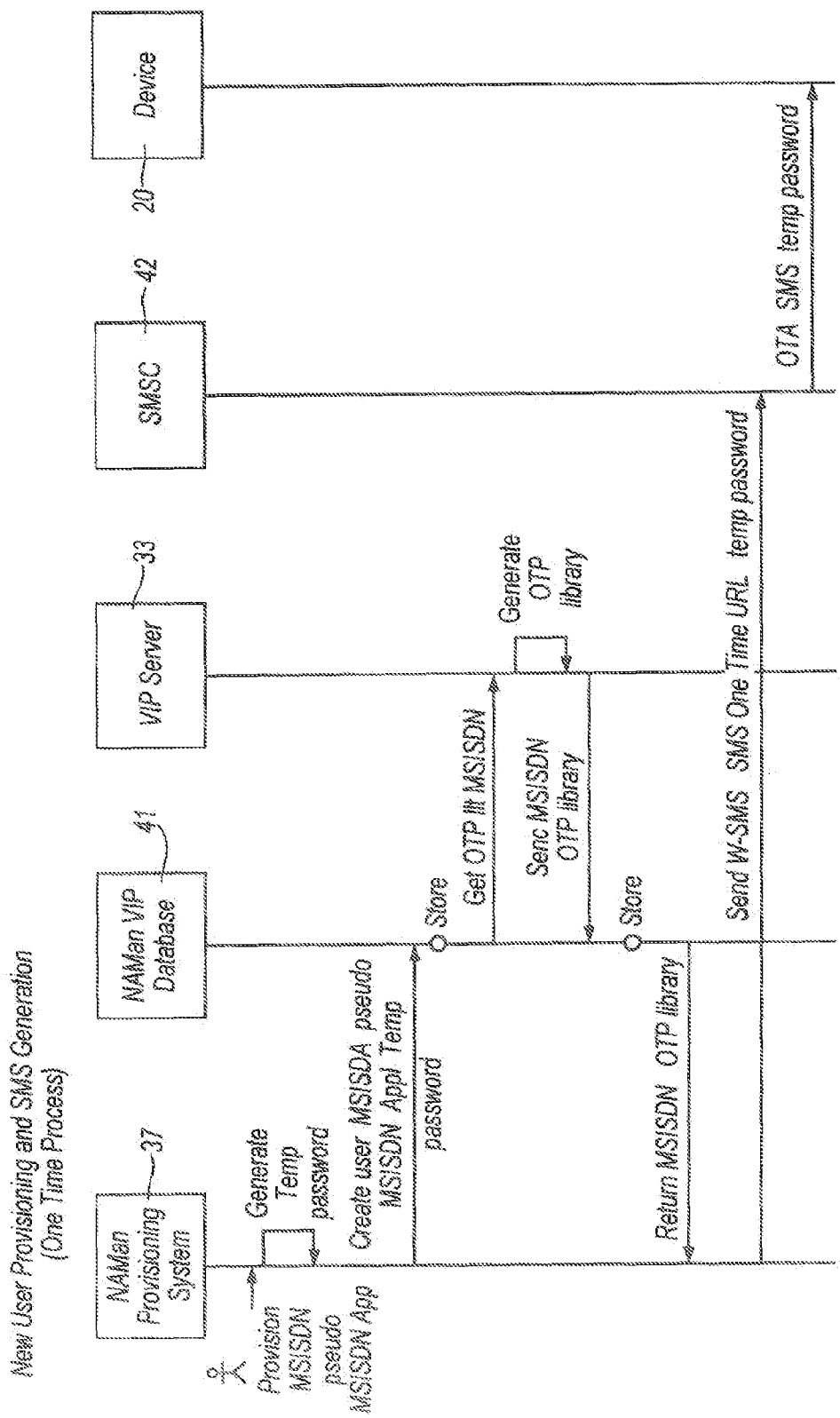
FIG. 4 illustrates a step diagram of a process for provisioning users to a client server system according to an embodiment of the system described herein.

FIG. 4, shows a sequence that may be used for provisioning users with the ability to access Enterprise Applications via the NAMan environment. The customer, typically the entity owning the Enterprise Application 35, first sends a request to add a new user (e.g. a new employee) to the provisioning server 37. This request includes a unique identifier of the new user, such as the new user's MSISDN and/or a Pseudo MSISDN, which can be used to provision users who are not customers of the managing service provider (e.g. to provision Orange™ and BT™ subscribers where the service provider managing the NAMan environment is Vodafone). The provisioning system generates a temporary password for the unique user ID which will be used at the time of the user's first access to the system. All this data is stored in relation to the new user's unique ID in database 41.

The unique user ID (e.g. its MSISDN/pseudo MSISDN) is then sent to the VIP server 33, together with a request for a One Time Password (OTP) library. This request is shown in FIG. 4 as being sent by the VIP database 41, although alternatively the Provisioning System 37 may issue the request.

The generated OTP library will then be stored in the database 41 for the specific unique user ID and a copy sent to the Provisioning Server 37. The provisioning server then generates a once usable URL request (i.e. the URL address of the download server (not shown) together with a unique once usable access code), with which the new user's terminal may source the client application.

It is to be appreciated that it is preferred that the URL request, is a one time URL request, in order to provide suitable security for the situation where no MSISDN for the requesting user can be determined. This is due to access to the Download server being through an Internet APN, so that the network cannot necessarily perform a RADIUS authentication. This therefore ensures that the SMS for download of the Application is used only once (i.e. to prevent multiple download of the client application using the same SMS URL request. The unique code can be generated by the VIP or Provisioning server and provided to the Download server, or vice versa.

An SMS is sent to the user terminal, which contains the URL request and the unique code, via the SMSC connected to the NAMan environment. The provisioning of the new user within the NAMan environment is then complete.

It is to be appreciated that the SMS messages are preferably sent to the appropriate Short Message Service Centres (SMSCs) via a Message Delivery Platform (MDP) 42. The MDP increases network efficiency by intelligently routing traffic through the network. The use of the MDP 42 is also advantageous in that the messaging server 36 in the NAMan framework does not need to be configured for a specific SMSC or for specific SMSC protocols, which is useful as new NAMan frameworks are introduced in different regions and different countries.

Now a process of the new user downloading the client application according to an embodiment of the invention will be described in relation to FIG. 5. In this regard, the new User opens the SMS and requests download of the client application from the Download server. The SMS includes a unique code, so that the Download server can recognise the requester. When the Download server receives the SMS URL request, it queries the database 41 for the user MSISDN corresponding to the unique SMS code. The system Database provides the MSISDN and the associated OTP library and expires the unique code so that it cannot be reused. The Download server burns the user MSISDN in the client platform/application and integrates the OTP library generated at the time of provisioning the customer.

Since the Download server needs to respond to requests from devices over the Internet, for security reasons this server ideally is logically and physically separated from the rest of the NAMan framework.

Once the Download server has sent the client platform/application and OTP library to the device, the client platform, by using appropriate APIs, extracts a unique identifier, such as the SIM serial number (i.e. its Integrated Circuit Card ID—ICCID) from the SIM card or an equivalent CDMA unique identifier from a CDMA device. The SIM serial number is ideally used instead of the MSISDN because not all SIM cards are populated with an MSISDN but all SIM cards do have a unique Global ICCID. Other unique identifiers such as IMSI from the SIM card or IMEI from the device can also be used.

The Client platform then opens up a SSL (Secure Sockets Layer) link towards the NAMan environment and sends the unique identifier to the Verification Access Module (VAC) 32. Upon receiving this information, the VAC 32 sends a request to the VIP server 33 for activation of the OTP library 22 associated with the unique identifier and the generation of a Shared Secret (SS). The VIP server 33 generates the shared secret, using the unique identifier, and sends the shared secret back to the VAC 32. The VAC 32 in turn transmits the shared secret 23 back to the client platform, where it is stored in an encrypted database, and closes the connection. From this it can be seen that the shared secret is known only to the client application 21 and the VIP server 33.

The client application is ideally downloaded Over The Air (OTA) in order to maintain the integrity of the provisioning process. Any other components of the device platform that are a pre-requisite for the proper working of the application can be downloaded separately using, for instance, PC connectivity.

The application downloaded at the end of this process is the client application, and typically has no enterprise/user data on it. The user Data is downloaded to the client application at a later stage, such as when the Client application first accesses the NAMan server 31.

A process of a user requesting access to the back-end application according to an embodiment of the invention will now be illustrated with reference to FIG. 6. Upon the user opening up the client application on the device, the application does a pre-check of the SIM serial no. in its database, which was collected at the time of generating the Shared Secret, against the actual SIM serial no. of the SIM card in that device. Alternatively, this check may be performed in relation to the MSISDN of the SIM, if one exists or a pseudo MSISDN provided to the device. Once the SIM serial no. is confirmed, the application would obtain the password for the NAMan server, such as by either asking the user to key in the NAMan password or extracting it from its cache memory, depending on the Security scheme used. Where this is the first use of the client application, the NAMan password will be the temporary password generated by the NAMan provisioning server 37 at the time of user provisioning and typically sent to the user's terminal as part of the initial Welcome SMS.

The client application 21 would then request a One-Time-Password from the OTP library 22. The One-Time Password is generated by the OTP library using the Shared Secret and an algorithm, both known only to the Client Application and the VIP Server 33. For instance, the One Time Password could be the Shared Secret multiplied by a particular counter contained in the OTP library, which is incremented/decremented each time a One-Time Password is generated (e.g. the counter reflects the number of times the OTP password has been generated).

Alternatively, the One Time Password could be the Shared Secret multiplied by another particular component in the OTP library, such as a random number generator or other algorithm, and the particular component is updated each time a One-Time Password is generated.

After the One-Time Password and NAMan password have been obtained, the client application opens up a SSL connection to the wireless network towards the VAC 32 and provides the passwords and the user's unique ID thereto. At this stage, the NAMan server may check the mobile terminal's credentials (e.g. the IMSI and/or IMEI and/or terminal MAC address) to ensure these match with information in its own database even before the two factor authentication begins. If the information does not match, the VAC server 32 would terminate any connectivity with the mobile terminal. This would ensure that the passwords are coming from the correctly provisioned mobile terminal.

Where the two factor authentication is to be performed, the VAC 32 in turn provides the unique user identifier (e.g. the MSISDN, pseudo MSISDN or SIM ID) to the VIP server, together with the One Time Password information and awaits confirmation.

The VIP server 33 uses the shared secret and OTP library stored in database 41 in relation to the unique user identifier to verify the One Time Password. That is, the VIP server 33 is itself able to generate the One Time Password using the shared secret and OTP library it has stored in relation to the unique user ID. Where the One Time Passwords match, this is not only an indicator that the user has an authorised version of the shared secret and OTP library, but also that the correct user is sending the information since the shared secret is user specific. Whilst this may be confirmed simply by virtue of the matching One Time Passwords, the VIP server may also "reverse engineer" the shared secret in order to confirm that the user ID used in its creation is the same as the user ID being sent with the One Time Password. This is a "first factor" of the authentication process.

There could be instances when a One Time Password sent by the mobile terminal does not match the OTP generated by the VIP server even for a legitimate user. This is possible when an earlier OTP generated by a mobile terminal for an authentication attempt failed to reach the server for any unknown reason but most likely due to a sudden loss of mobile/wireless network access or a data session drop at any of the intermediate elements in the mobile/wireless network. As per the normal behaviour, the counter that is used to generate the OTP, in conjunction with the shared secret, had been incremented but did not reach the server. Since the server did not receive the OTP, it has not generated a corresponding OTP. Therefore the OTP sent by the mobile terminal on a subsequent request would be out-of-sync with the value as expected at the VIP server since the counter value is different. This would lead to failure of authentication even though the access is legitimate and as per the correct process to generate OTP from the client application.

To avoid such a scenario, if the VIP server receives an OTP that is not expected as the next OTP but still is from the 'family' of OTP that it should have received in subsequent requests, then the VIP server will allow the request and send back a confirmation. It will also increment its counter sequence number to the one that was received at the last request for that unique user. This 'family' of OTP can be generated by the VIP server by advance calculating the next 'n' requests that it should receive from the unique user using the OTP library.

Alternatively, or in addition, to be sure of the legitimacy of the mobile terminal from which the request originated, the VIP server can send a 'challenge' back to the client platform of the mobile terminal. In this challenge request, VIP server can ask the client platform to increment its counter by 'x' number of sequences from the last value used by it and calculate a fresh OTP using the shared secret. This is then received by the VIP server through the VAC and VIP server checks whether the OTP is the one that was expected for that counter value. Since the OTP can be generated by the correct counter value by either mobile client or the VIP server, this confirms that the request has originated from a legitimate source. Once authenticated the VIP server sends the confirmation back to the VAC.

At the end of either of these methods, ie change in counter value at either the VIP server or the mobile terminal, the OTP sequences are again in-sync at both the ends.

After the VAC 32 receives the confirmation from the VIP server 33 that the OTP password is valid, the VAC 32 provides the unique user ID (e.g. the MSISDN) and NAMan password to the NAMan server 31 and awaits confirmation. The NAMan server checks the password stored in the database 41, alongside the unique user ID. This is the second factor of the authentication process. Once the password has been verified as correctly corresponding to the unique user ID, the NAMan server 31 acknowledges such with the VAC 32, and the VAC would provide the user with access to the NAMan Server 31.

Alternatively, where the two factor authentication fails, the VAC would terminate the connectivity between the VAC and the device 20. Also, the unique user ID of any device that has not completed the two factor authentication would ideally be stored in a 'Grey List' folder in the NAMan/VIP database. Records in the 'Grey List' would be provided as part of the reporting file generated.

Once authenticated in this way, the user may be automatically granted access to the NAMan server, or the VAC may request the User to provide an Enterprise Application Username and Password, depending upon the security scheme utilised. For instance, a password/username may not be required for the Enterprise Application. Further, where an Enterprise password is required, there may be requirements as to whether the password must be stored offline or whether it may be stored on the client or online on the server. The same storage variations may also be applied to the NAMan password, depending on the level of security required. It is also to be appreciated that where more than one application is available on the mobile terminal, each application may have its own security scheme.

At the same instance as notifying the user that access to the NAMan server 31, has been authorised, or requesting the user's credentials for the enterprise server, the VAC starts two timers, a Data sync timer and a Delay sync timer which set a maximum period in which to receive the response back from the user and the NAMan server, respectively. Where an Enterprise Application username and password is requested, this information is sent to the NAMan server. The NAMan server may then verify the user's credentials, or forward the data to the Enterprise Application for verification.

The Data sync timer is typically of a much shorter duration than the Delay sync timer, and reflects the time within which the device is expected to send any required application data. All data received within this time is processed as intended and both the timers are reset where data is received. However, if the data sync timer expires, the VAC is required to authenticate the user again. To make this re-authentication process simple and user friendly, the user is preferably not asked to re-enter their password, but instead authentication is only done on the basis of another One-Time-Password i.e. the first factor of the authentication process, which is transparent to the user.

After the expiry of Delay sync timer, on the other hand, the VAC would terminate the entire session with the client application. Any further request would require the 2 factor authentication to be done again.

The timers are an important part of the process that maintains connectivity security between the client and gateway using the same OTP key generation in the background to re-authenticate the terminal, where necessary. By performing the re-authentication in the background, a balance can be maintained between the security requirements of the system and an acceptable user experience.

For instance, in once implementation, where no response is received by the end of the first timer, the VAC requests the next access be authenticated again, but this time the authentication process would be transparent to the user. Where no response is received by the end of the second timer, the VAC would break the session automatically and the next request would need to complete the full authentication process.

Upon the VAC providing the user device with access to the NAMan server, the VAC passes the connectivity to the NAMan server and refreshes the timers. Where the client application already has Enterprise data downloaded, the NAMan server synchronises the data, by updating the Enterprise application, and checking for any data update that needs to be sent back to the device's client application. Either the new data or a confirmation is sent back to the device. When all the data has been synchronised, the device application closes the link with the NAMan environment and the VAC server expires the Data sync and Delay sync timers.

In this way, the connection with the client application is preferably kept open while the client application is running. That is, the connection between the client application and the server is an "always on" connection, unless the connection is lost, such as due to a temporary loss of coverage, or the device/network cannot support more than one simultaneous PDP context. By enabling an "always on" connection, there is no need to re-establish the SSL/TCP connection once the initial connection is made.

Therefore, as described above, according to this embodiment of the invention, before the user has access to the NAMan server, a two factor authentication process is undertaken. Preferably one part of this two factor process uses an industry recognised authentication mechanism, such as can be provided by Verisign™. More specifically, the first part of the authentication is token-based such that it is based upon a unique One-Time-Password (OTP).

The OTP is unique for every transaction and identifies the user since the shared secret provided to the client application is uniquely associated with the user's unique ID by the VIP server. This therefore ensures that any user with a correct username and password to access the NAMan server undergoes an additional authentication before access is allowed. In other words, this additional authentication ensures that the username and password are being used by the actual registered user, by verifying that the data is emanating from a terminal containing the SIM card registered for the user, for instance.

Therefore, in this way the One-Time-Password is effectively a first authentication factor of information/data the user is in possession of (e.g. the registered SIM), which can be verified, and the second authentication factor is information that the user knows, (e.g. the user's password and/or username). Depending on the security model used, the user either enters this password on the device or it is stored in the cached memory of the client application.

Advantageously this two pronged verification provides enhanced security, and removes the requirement of provisioning each NAMan server with a specific APN and accordingly requiring GGSNs to be configured to recognise the APN. This in turn means that communications no longer need to be transmitted via the specially configured GGSN 11, so that advantageously any network operator may forward communications directly to the NAMan environment according to the embodiments of the present invention.

Further, by using the shared secret in the generation of each OTP, the security of the password is enhanced, as this is information potential hackers would not be able to obtain through communication tracking, since the shared secret is known only to the VIP server and the client application, and is only transmitted between the two entities at download of the client application, and even then in an encrypted format.

The process of OTP generation and authentication is transparent to the user and preferably performed by the Client application automatically every time the application on the device tries to connect to the NAMan environment. This is applicable during synchronization of any update initiated from the device or received on the device from NAMan server.

It is to be appreciated that in these embodiments of the invention the NAMan server is independent of the authenticating elements and so can be enhanced, replaced or removed without necessitating any changes to the working of the two factor authentication procedure.

The embodiments of the invention have been described in relation to their use over mobile telecommunication networks; however, the embodiments are equally applicable to users on non-mobile, but wireless networks.

Additionally, the embodiments have generally been described with particular emphasis on authentication occurring via the MSISDN from the user's SIM card, however any other unique user identification may be utilised, such as a CDMA unique identifier, the IMSI, IMEI or MAC address. Further, multiples of any of these unique identifiers may be used in creating the OTP.

The embodiments of the invention have also been described in relation to the first factor of authentication being the one time password and the second factor the user known password. This process however can also be applied in reverse.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of providing user authorisation for accessing a back-end system in a mobile telecommunications network including a gateway system, where one or more designated mobile terminal users are authorised to access the back-end system via the gateway system, the method comprising:
    initially verifying mobile network identity data relating to a designated mobile terminal user against data on a subscriber identity module (SIM) card associated with a mobile terminal of the designated mobile terminal user;
    receiving an access request, the access request including the mobile network identity data relating to the designated mobile terminal user and a first password generated with the client application of the mobile terminal using first information, wherein the first information includes a shared secret accessible to the mobile terminal and the gateway system, wherein the first information is specific to the mobile terminal of the mobile terminal user, and wherein the first password generated using the first information is independent of any information input by the mobile terminal user and is a one-time password;
    and
    verifying the first password by comparing the first password received in the access request with a corresponding password independently generated by a component of the gateway system using corresponding first information stored in relation to the mobile network identity data of the designated mobile terminal user, wherein the verification of the first password is an additional verification of the mobile network identity data that enables authentication of the designated mobile terminal user in a manner that is independent of identity data from other components of the mobile telecommunications network.

2. The method of claim 1, further comprising:
    receiving a second password from the designated mobile terminal user, the second password indicative of information known by the designated mobile terminal user, wherein the second password is included in the access request;
    verifying the second password by comparing the second password with a corresponding password stored in relation to the mobile network identity data of the designated mobile terminal user; and
    authorising the designated mobile terminal user to access the back-end system when both the first and second passwords have been verified.

3. The method of claim 1, wherein, once the designated mobile terminal user has been authorised to access the back-end system, a further password, generated using the first information, is included with every communication transmitted to the gateway system, and the method further comprises:
    verifying each further password received by comparing each further password with a corresponding password generated by a component of the gateway system using the first information stored in relation to the mobile network identity data of the designated mobile terminal user on the gateway system.

4. The method of claim 1, wherein the first password is generated using the first information and a component of a password library, wherein the corresponding password is generated using corresponding first information and the component of the password library, such that the password library enables the first password and its corresponding password to be successively updated, so that each such subsequent set of first and corresponding passwords that are generated in respect of the designated mobile terminal user are unique.

5. The method of claim 1, wherein the first information is generated using at least one of: a SIM serial number, an IMSI identifier, an IMEI identifier, and an MSISDN identifier.

6. A non-transitory, computer-readable medium storing software that, when executed, performs a method of generating authorisation data in a mobile terminal of a designated mobile terminal user, in order to allow the designated mobile terminal user access to a back-end system using the mobile terminal on a mobile telecommunications network including a gateway system, where one or more designated mobile terminal users are authorised to access the back-end system via the gateway system, the method comprising:
    verifying mobile network identity data unique to the designated mobile terminal user against data on a subscriber identity module (SIM) card associated with the mobile terminal;
    generating a first password using first information stored securely on the mobile terminal, wherein the first information includes a shared secret accessible to the mobile terminal and the gateway system, wherein the first information is specific to the mobile terminal of the mobile terminal user, and wherein the first password generated using the first information is independent of any information input by the mobile terminal user and is a one-time password; and
    transmitting an access request for the back-end system, via the mobile telecommunications network, the access request including the first password and the mobile network identity data relating to the designated mobile terminal user, wherein the first information corresponds to corresponding first information stored in relation to the mobile network identity data of the designated mobile terminal user on the gateway system, which allows a component of the gateway system to verify the first password by comparing the first password with a corresponding password independently generated using the corresponding first information, and wherein the verification of the first password is an additional verification of the mobile network identity data that the authentication of the designated mobile terminal user in a manner that is independent of identity data from other components of the mobile telecommunications network.

7. The non-transitory computer-readable medium of claim 6, wherein the mobile network identity data includes at least one of: a Mobile Subscriber International Subscriber Identity Number (MSISDN), a SIM serial number, an International Mobile Subscriber Identity (IMSI), an International Mobile station Equipment Identity (IMEI), a pseudo MSISDN, an Integrated Circuit Card ID or an equivalent unique Code Division Multiple Access (CDMA) device identifier.

8. The non-transitory computer-readable medium of claim 6, wherein the method further comprises:
  obtaining a second password, the second password indicative of information known by the designated mobile terminal user of the mobile terminal; and
  transmitting the second password and the mobile network identity data relating to the mobile terminal, wherein the second password has a corresponding second password stored in relation to the mobile network identity data of the designated mobile terminal user on the gateway system, which allows verification of the second password by comparing the second password with the corresponding second password, and such that the mobile terminal is authorised to access the back-end system when both the first and second passwords have been verified.

9. The non-transitory computer-readable medium of claim 6, wherein, once the mobile terminal has been authorised to access the backend system, generating a further first password, using the first information, and transmitting a further first password with every communication transmitted.

10. The non-transitory computer-readable medium of claim 6, wherein the first password is generated using the first information and a component of a password library, such that the password library enables the first password to be successively updated, so that each subsequent first password that is generated in respect of the mobile terminal is unique.

11. The non-transitory computer-readable medium of claim 6, wherein the first information is generated using at least one of: a SIM serial number, an IMSI identifier, an IMEI identifier, and an MSISDN identifier.

12. A telecommunications system for use in a mobile telecommunications network, configured to provide one or more designated mobile terminal users with access to a back-end system via the mobile telecommunications network, the telecommunications system comprising:
  a mobile terminal, including:
    a client application configured to verify mobile network identity data unique to a designated mobile terminal user with data on a subscriber identity module (SIM) card associated with the mobile terminal; and
    a processor that generates a first password using first information stored securely on the mobile terminal, wherein the first information includes a shared secret accessible to the mobile terminal and a gateway system of the mobile telecommunications network, wherein the first information is specific to the mobile terminal of the mobile terminal user, and wherein the first password generated using the first information is independent of any information input by the mobile terminal user and is a one-time password, wherein, after verifying the mobile network identity data and generating the first password, an access request that includes the first password and the mobile network identity data relating to the designated mobile terminal user of the mobile terminal is transmitted, wherein the first information corresponds to corresponding first information stored in relation to the mobile network identity data of the designated mobile terminal user on the gateway system, wherein the first password is verified by comparing the first password with a corresponding password independently generated using the corresponding first information, wherein the verification of the first password is an additional verification of the mobile network identity data that enables authentication of the designated mobile terminal user in a manner that is independent of identity data from other components of the mobile telecommunications network; and
  the gateway system, including:
    a receiver configured to receive the access request from a designated mobile terminal user across the mobile telecommunications network, the access request including a unique identity relating to the designated mobile terminal user and the first password generated by a mobile terminal of the designated mobile terminal user using the first information; and
    a verification server having at least one processor that executes software stored on a non-transitory computer readable medium to:
      retrieve corresponding first information stored in relation to the unique identity of the designated mobile terminal user;
      independently generate a corresponding password using the corresponding first information; and
      verify the first password by comparing the first password with the corresponding password, wherein the first information includes mobile network identity data unique to the designated mobile terminal user, wherein the verification of the first password at the gateway system is an additional verification of the mobile network identity data that enables the gateway system to authenticate the designated mobile terminal user in a manner that is independent of identity data from other components of the mobile telecommunications network.

13. The telecommunications system of claim 12, wherein the mobile network identity data includes at least one of: a Mobile Subscriber International Subscriber Identity Number (MSISDN), a SIM serial number, an International Mobile Subscriber Identity (IMSI), an International Mobile station Equipment Identity (IMEI), a pseudo MSISDN, an Integrated Circuit Card ID or an equivalent unique Code Division Multiple Access (CDMA) device identifier.

14. The telecommunications system of claim 12, wherein:
  the receiver is further configured to receive a second password, the second password indicative of information known by the designated mobile terminal user; and
  the verification server is further configured to verify the second password by comparing the second password with a corresponding second password stored in relation to the mobile network identity data of the designated mobile terminal user on the gateway system, and authorize the designated mobile terminal user to access the back-end system when both the first and second passwords have been verified.

15. The telecommunications system of claim 12, wherein, once the designated mobile terminal user has been authorised to access the backend system, the designated mobile terminal user includes a further first password, generated using the first information, with every communication transmitted, and the verification server is further configured to verify each further first password received, by comparing each further first password with a corresponding password generated by using the corresponding first information.

16. The telecommunications system of claim 12, wherein the first password is generated using the first information and a component of a password library, and the verification server is further configured to retrieve a corresponding component of a corresponding password library and independently generate the first password using the corresponding component and the corresponding first information, such that the password library enables the first password and its corresponding password to be successively updated, so that each such subsequent set of first and corresponding passwords that are generated in respect of the designated mobile terminal user, are unique.

17. The telecommunications system of claim 12, wherein the first information is generated using at least one of: a SIM serial number, an IMSI identifier, an IMEI identifier, and an MSISDN identifier.

* * * * *